Figure 1:
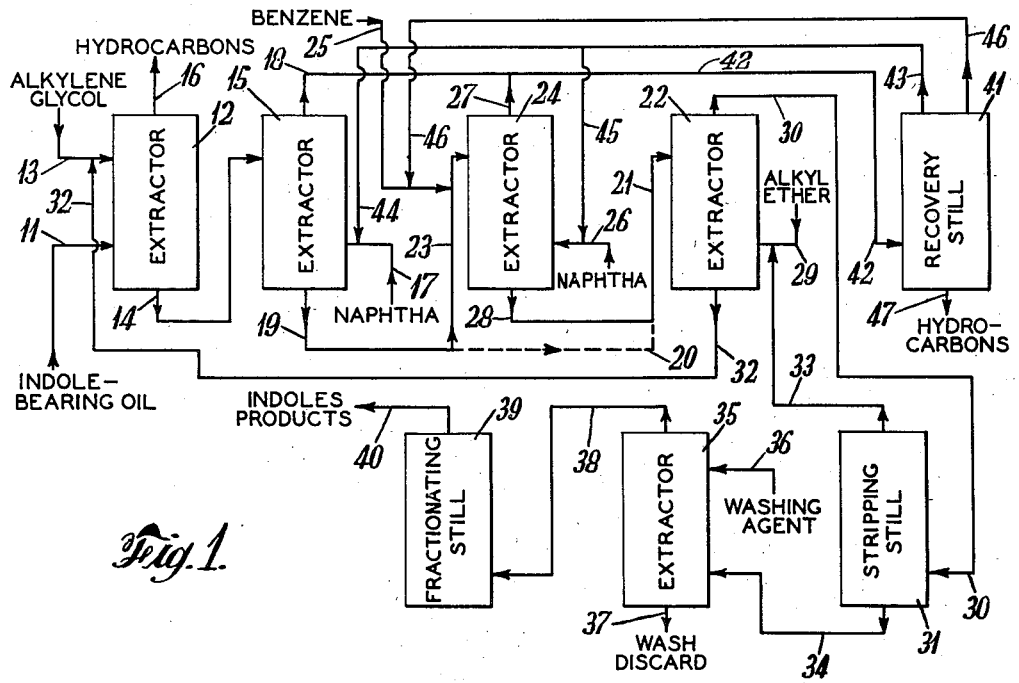

June 3, 1958   J. R. ANDERSON ET AL   2,837,531
EXTRACTION OF INDOLES
Filed May 9, 1955   6 Sheets-Sheet 1

INVENTORS
JOHN R. ANDERSON
DAVID W. PECK
BY J. Hart Evans
ATTORNEY

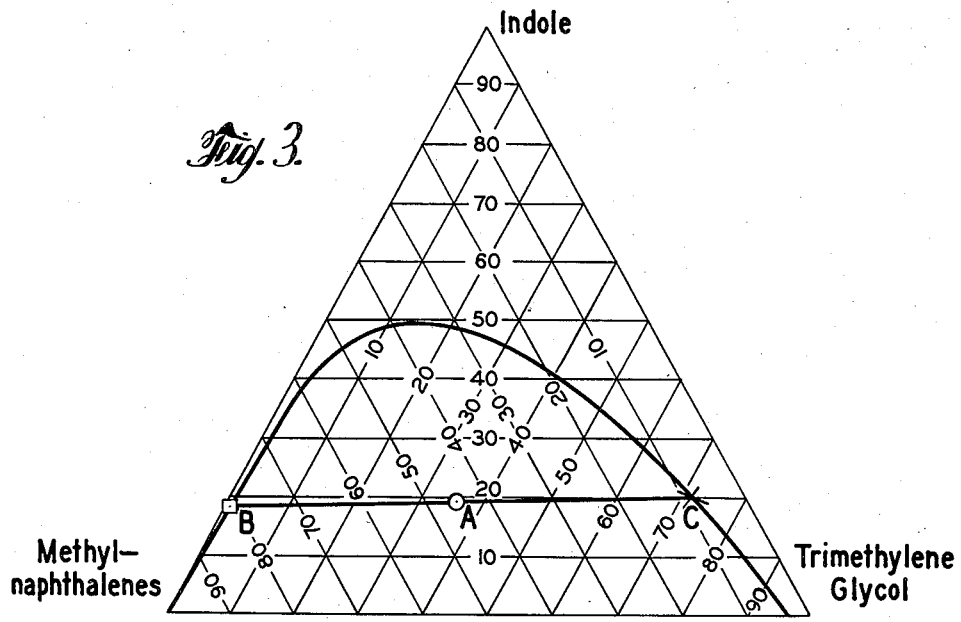
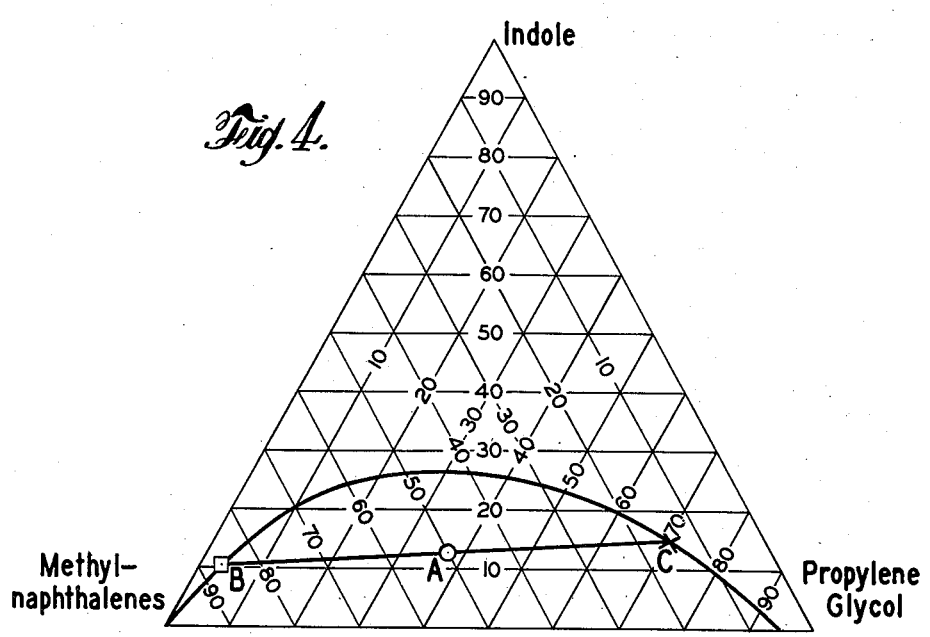

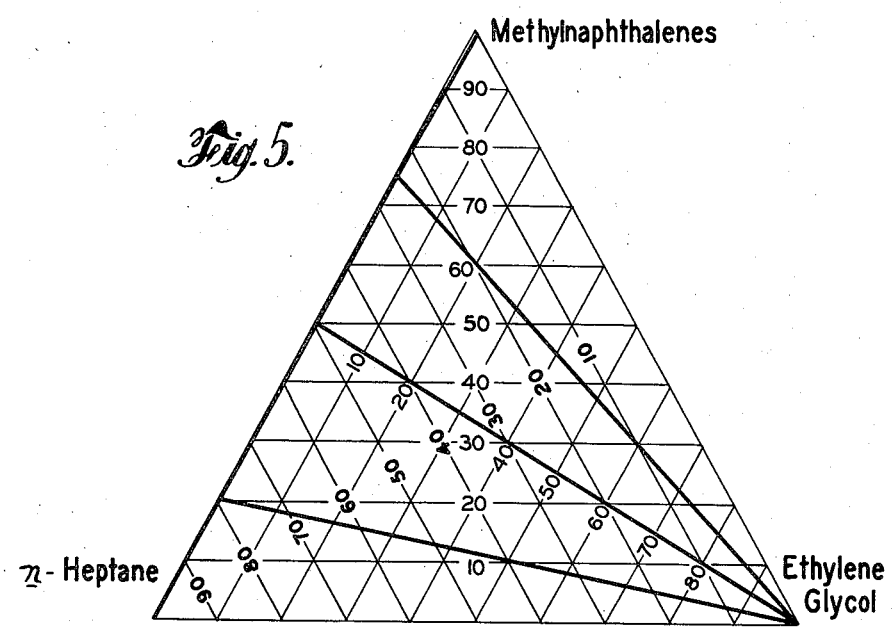
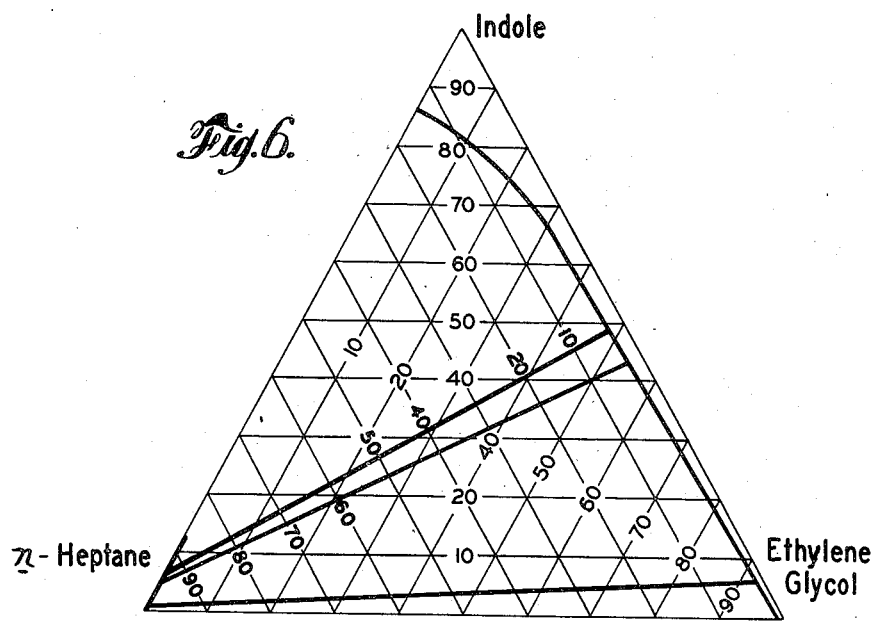

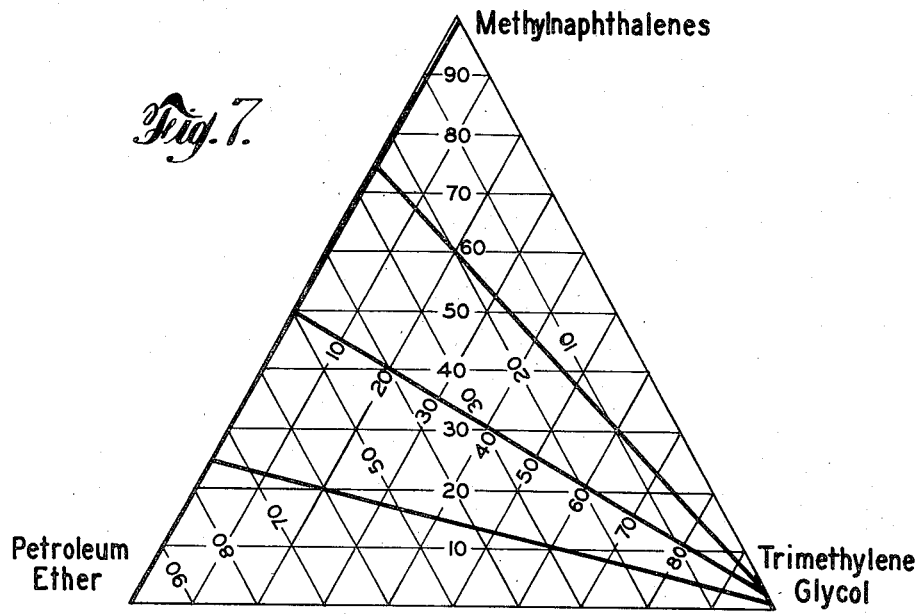
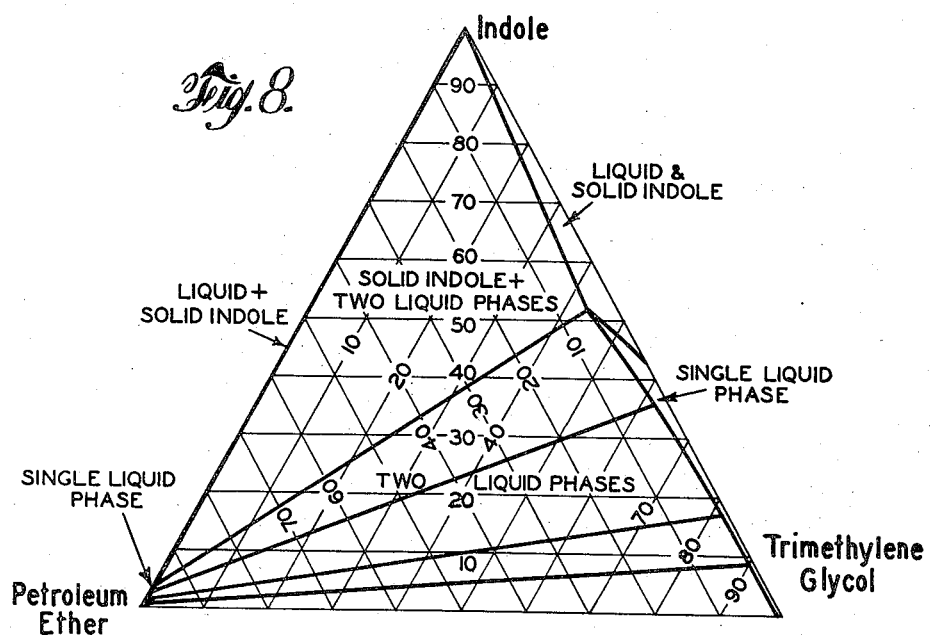

INVENTORS
JOHN R. ANDERSON
DAVID W. PECK
BY J. Hart Evans
ATTORNEY

# United States Patent Office 2,837,531
Patented June 3, 1958

2,837,531
EXTRACTION OF INDOLES

John R. Anderson, Pittsburgh, Pa., and David W. Peck, South Charleston, W. Va., assignors to Union Carbide Corporation, a corporation of New York Application May 9, 1955, Serial No. 506,978

18 Claims. (Cl. 260—319)

This invention relates to a continuous method for separating indole and its homologs from admixtures with the other substances, and more particularly from the industrial products in which the indoles occur. More specifically, the invention relates to a continuous method whereby the indoles in industrial products or similar mixtures are treated successively with an alkylene glycol, a naphtha and an alkyl ether to recover relatively pure indoles.

Indole is used in the production of perfumes and in the synthesis of tryptophane, an essential amino acid. More widespread industrial use would be likely except for its scarcity and high cost. It occurs naturally in organic sources such as oil of jasmine, clove oil and the products of putrefaction of amino acids. The major commercial source at present is the coke industry, where indole is recovered from coal tar oil. A new source of supply, however, is now being found with the commercial development of coal hydrogenation processes. Indole is found in the so-called neutral light oil fraction derived from the coal by hydrogenation. The neutral light oil fraction is composed principally of aromatic and paraffin hydrocarbons; the tar acids and bases having been separated from it. Although indole, which has the formula:

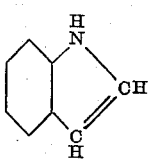

is a nitrogen containing compound similar in structure to the nitrogen bases, it is neutral to weakly acid in nature and resembles the aromatic hydrocarbons in many of its properties, which accounts for its being found in the neutral light oil fraction rather than with the nitrogen bases as might be expected.

In the past indole has been recovered from the appropriate fraction of coal tar oil by taking advantage of the weakly acidic properties of its N—H group. This involves precipitating the potassium or sodium salt of indole, separating the salt from the oil mixture, and then hydrolyzing the salt to give indole and potassium or sodium hydroxide. A number of German patents, including Nos. 223,304, 238,138 and 454,696, disclose this method, which is unsatisfactory in that multiple treatment of the indole fraction is necessary to obtain indole of sufficiently high quality, and each step must be carried out batchwise.

By the continuous process of our invention relatively pure indoles of high quality are produced in quantity from the industrial products in which they occur, such as neutral light oil from coal hydrogenation, coke oven oil or coal tar oil, or from any hydrocarbon mixture containing indoles. Indole-bearing oils also frequently contain phenolic compounds and nitrogen bases. Compounds of these types are not separated from the indoles by the process and must be removed by established techniques.

According to the process of our invention, the indole-bearing oil is first extracted with an alkylene glycol, for example ethylene glycol. The glycol extracts substantially all of the indoles present and only a very small proportion of the aromatic hydrocarbons. This extract is then extracted with a low-boiling hydrocarbon naphtha, which removes as extract most of the aromatic hydrocarbons still present, leaving the indoles and the alkylene glycol. This latter mixture is then extracted with an alkyl ether, as for instance isopropyl ether, which ether extracts the indole leaving the glycol which can then be reused for further extraction. The ether is distilled from the extract to yield relatively pure indoles. The indoles can then be fractionated and further purified as desired. If, however, any phenols or nitrogen bases other than those of the indole type were present, they will have been carried along with the indoles and are removed after the stripping off of the ether and before fractionation of the indoles, employing conventional extraction techniques.

The drawing is a flow sheet of one embodiment of the invention, showing how the solvents may be recovered and recycled. In the drawing, the indole-bearing oil is introduced through line 11 into the first extractor 12. An alkylene glycol is introduced into the extractor 12 through line 13. As the extraction process takes place in the first extractor 12, the extract, comprising glycol, indoles and a small proportion of aromatic hydrocarbons, is removed through line 14 and carried into the second extractor 15. The hydrocarbons left from the first extraction are removed from extractor 12 through line 16. A naphtha is introduced into the second extractor 15 through a feed line 17, and as the extraction proceeds, the extract of naphtha and aromatic hydrocarbons is removed through line 18. The residue from the second extractor 15, comprising glycol, indoles and traces of aromatic hydrocarbons, is removed through line 19.

If, as is true in most cases, the glycol-indoles mixture is substantially free of aromatic hydrocarbons, it flows from line 19 through lines 20 and 21 into an extractor 22 where it is extracted with an alkyl ether as described later. If, however, the glycol-indoles mixture still contains an objectionable quantity of aromatic hydrocarbons, it may be further extracted with naphtha after the addition of benzene to replace the bulk of any remaining high-boiling aromatic hydrocarbons. In such cases the glycol-indoles mixture is removed from the extractor 15 through line 19 and is conducted from line 19 through line 23 into extractor 24. Before the mixture is admitted to extractor 24, benzene is added into the mixture in line 23 through benzene feed line 25. Naphtha is introduced into the extractor 24 through naphtha feed line 26, and as the extraction proceeds the extract comprising naphtha, excess benzene and high-boiling aromatic hydrocarbons is removed through line 27. The glycol-indole mixture remaining is removed through line 28 and conducted through line 21 into extractor 22.

An alkyl ether is fed into extractor 22 through line 29, and as the extraction of the indoles by the ether proceeds, an ether-indole extract is removed through line 30 and led into stripping still 31. The alkylene glycol remaining is removed through line 32 and recycled through this line to alkylene glycol feed line 13 for reuse in extractor 12. In the stripping still 31, the ether is stripped from the indoles and removed through line 33 and recycled to the alkyl ether feed line 29 for reuse in extract 22. The benzene which has replaced the high-boiling aromatic hydrocarbons will be stripped off with the ether, leaving the indole free of aromatic hydrocarbons. After the ether is stripped off, the concentrated indoles are removed through line 34 and led into an extractor 35 where they are extracted one or more times with a washing agent which is introduced through line 36. The wash extract of impurities is removed through line 37 and discarded and the indoles are removed through line 38. If the only impurity is residual alkylene glycol, the washing agent suitable is water. If, however, phenols and nitrogen bases are present, and they will have been carried through the process with the indoles to this stage if present originally in the indole-bearing oil feed, the suitable washing agents are aqueous base solutions and aqueous acid solutions, which will remove phenols and nitrogen bases as well as alkylene glycol. Water washing is usually then employed to remove any residual acid. The concentrated indoles are led through line 38 into fractionating still 39. The products, indole and its homologs, are removed from the fractionating still 39 through line 40.

The flow diagram includes a recovery still 41 for recovery of the naphtha and the excess benzene used in the process. The mixtures of naphtha and aromatic hydrocarbons from extractor 15 in line 18 and from extractor 24 in line 27, the latter mixture including benzene, are conducted through line 42 to the recovery still 41. In this still 41 the naphtha is separated by distillation and recycled to the process through line 43. From line 43 recycled naphtha is fed through line 44 to naphtha feed line 17 for reuse in extractor 15 and through line 45 to naphtha feed line 26 for reuse in extractor 24. Benzene from the recovery still 41 is recycled through line 46 to benzene feed line 25 for reuse in extractor 24. The other hydrocarbons are removed from recovery still 41 through line 47 for utilization elsewhere.

Figure 2:
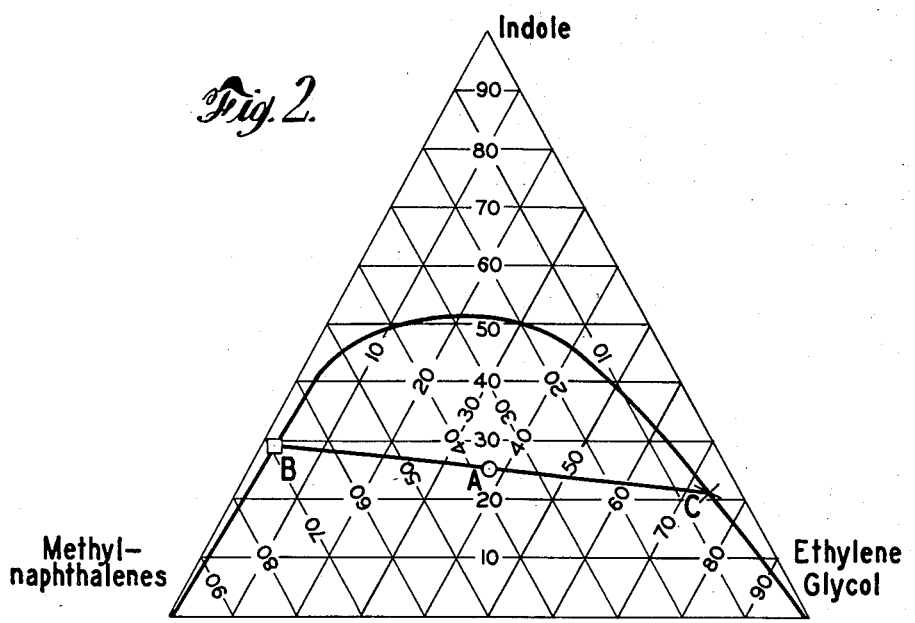

The primary solvent is an alkylene glycol which is miscible with indoles but substantially immiscible with the ether used and with hydrocarbons. Preferably, the alkylene glycol used is water-soluble so that any of the glycol dissolved in the ether during the ether extraction may be readily removed by water-washing. Alkylene glycols which can be used include ethylene glycol, trimethylene glycol, propylene glycol, diethylene glycol and triethylene glycol. Because of a higher degree of immiscibility with the ether used, those preferred are ethylene glycol, trimethylene glycol and the propylene glycol, with ethylene glycol being the most preferred. Ethylene glycol is demonstrated in Example I and Fig. 2 of the drawing. Trimethylene glycol is demonstrated in Example II and Fig. 3, and propylene glycol is demonstrated in Example III and Fig. 4. Maximum effectiveness of the primary extraction is obtained by the use of multistage extraction columns, although in some cases single stage extraction may be sufficient. The solvent to feed ratio for the extraction should be between 20 to 1 and 1 to 20, with about 1 to 1 preferred. The pressure and temperature of the extraction operation should be such that the feed, the solvent, the extract and the raffinate are all liquids, with atmospheric pressure and temperature ordinarily being suitable. If desirable, water may be added to the glycol solvent to affect its selectivity.

The naphthas suitable for the back-wash can be generally characterized as low-boiling nonaromatic hydrocarbons, preferably those boiling between 50° and 110° C. Any such non-aromatic hydrocarbon would ordinarily be suitable if benzene is not added during the process as a displacing agent. Such suitable naphthas include n-heptane, petroleum ether and cyclohexane. If, however, benzene is present in appreciable amount in the original indole-bearing oil, or if benzene is added during the process, the naphtha selected must be one which does not form with benzene an azeotrope of high benzene content, preferably a naphtha boiling below 70° C. or above 105° C. Thus cyclohexane would not be suitable as the nonaromatic hydrocarbon or naphtha if benzene were present, inasmuch as cyclohexane and benzene form an azeotrope with a high benzene content. n-Heptane, however, would be suitable because while it does form an azeotrope with benzene, the azeotrope contains very little heptane.

Figure 9:
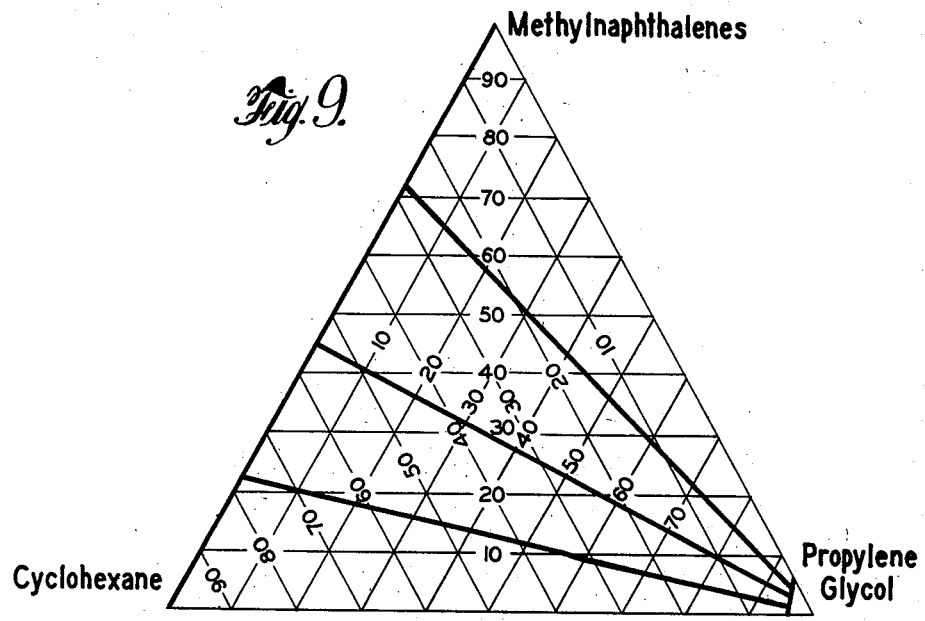
Figure 10:
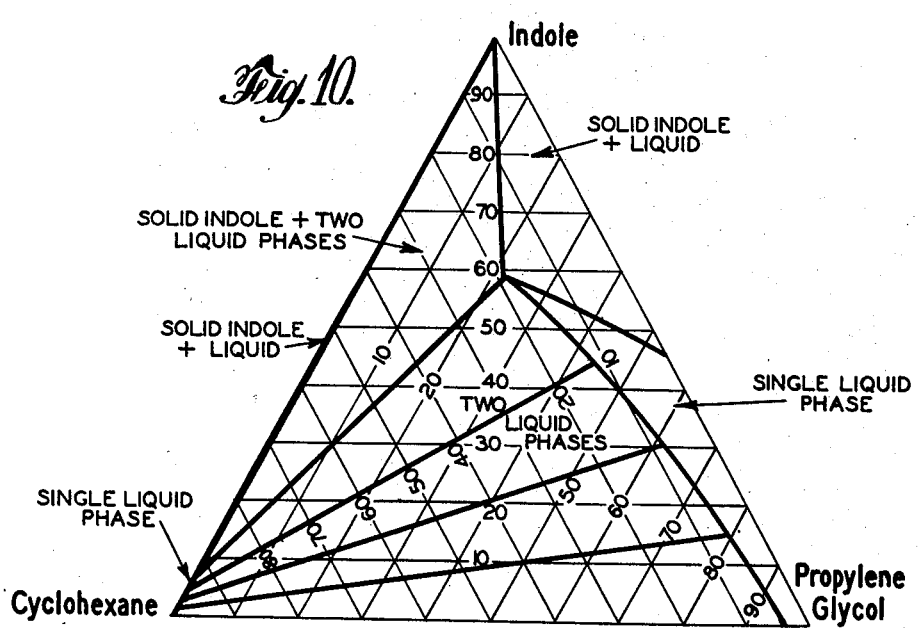

The tie lines of Fig. 5 show that n-heptane will readily extract aromatic hydrocarbons from ethylene glycol, while those of Fig. 6 show that such an extraction will leave the bulk of the indole in the ethylene glycol. The suitability of petroleum ether for the back extraction of aromatic hydrocarbons from alkylene glycols is shown in Figs. 7 and 8 of the drawing, and of cyclohexane in Figs. 9 and 10. The back-extraction may be carried out with naphtha alone, using either single stage or multistage extraction.

Ordinarily, one back-extraction with naphtha will be sufficient to remove the aromatic hydrocarbons from the glycol-indoles mixture, but in some cases it may be desirable to perform a second back-extraction with naphtha, after adding from 2 to 10 percent by weight of benzene or toluene or the like to the feed. The benzene serves to displace the higher boiling aromatic hydrocarbons which may have been homogenized into the solvent by the indoles, and to acocmplish this, an excess of benzene, a substantially larger amount than the quantity of aromatic hydrocarbons presumed to still be present, is added so that nearly all of the higher boiling aromatic hydrocarbons are displaced. The excess benzene is removed by the naphtha back-extraction and is recovered. The small amount of benzene which replaces the high-boiling aromatic hydrocarbons in admixture with the indoles can then be readily distilled when the ether is stripped off.

The feed to solvent ratio for back-extraction without benzene should be between 20 to 1 and 1 to 20, with about 1 to 1 being preferred. With benzene added to the feed, the ratio should be between 20 to 1 and 1 to 20, with 2 to 1 preferred. Operating pressure and temperature for the back-extraction should be such that the feed, the solvent, the extract and the raffinate are all liquids, with atmospheric pressure and temperature ordinarily suitable.

Figure 11:
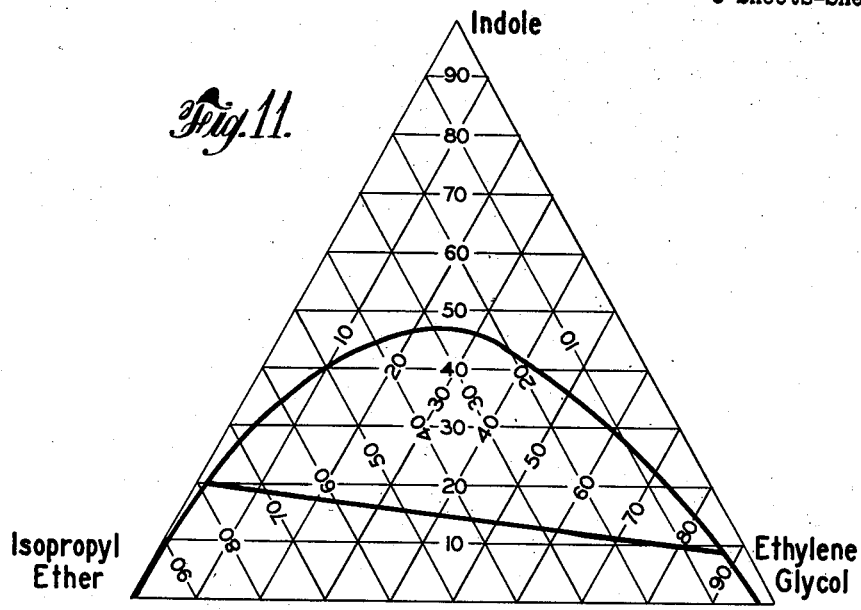
Figure 12:
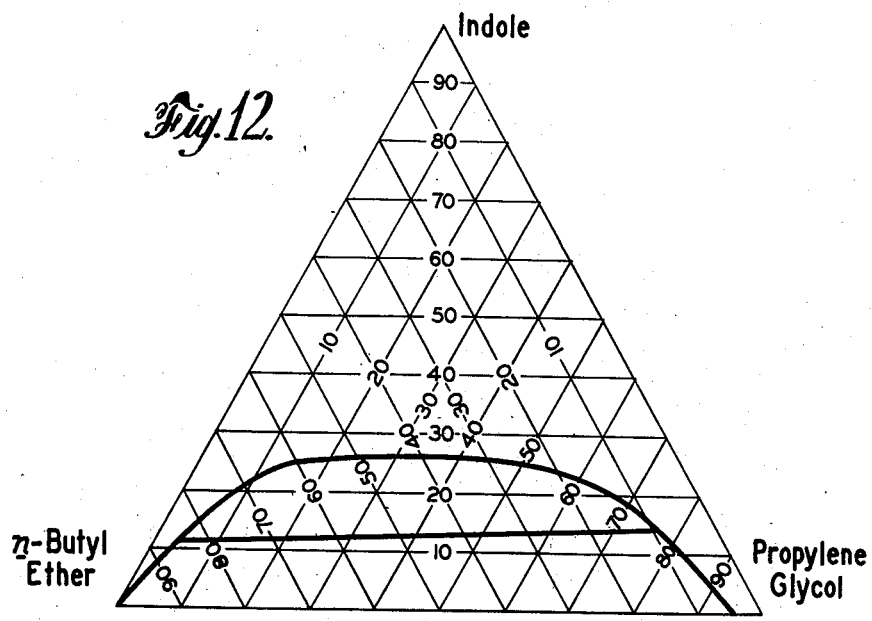

The ether used for separating indoles from the glycol solvent must be miscible with the indoles but immiscible with alkylene glycols, as well as low boiling, so that it may be readily distilled. Suitable ethers include isopropyl ether and n-butyl ether. Fig. 11 of the drawing shows the suitability of isopropyl ether for extracting indole from an alkylene glycol and Fig. 12 shows the like suitability of n-butyl ether. The ratio of feed to ether solvent for this final extraction should be between 20 to 1 and 1 to 20 with about 1 to 1 preferred. The pressure and temperature of the extraction operation should be such that the feed, the solvent, the extract and the raffinate are all liquids, with atmospheric pressure and temperature being ordinarily suitable.

As stated above, any phenols or nitrogen bases other than indoles which are present in the original feed oil will be carried along with the indoles. These should be removed after the ether is stripped off and before fractionation of the indoles, as by washing with aqueous caustic to remove the phenols and with an aqueous mineral acid to remove the nitrogen bases as previously shown.

*Example I*

Indole was extracted from admixture with methylnaphthalenes (50 percent alpha methylnaphthalene and 50 percent beta) by the use of ethylene glycol. The mixture consisted of 40 percent by weight of indole and 60 percent by weight of methylnaphthalenes. Sufficient ethylene glycol was added to give a system having the composition shown at point A in Fig. 2 of the drawing, which was by weight 25.2 percent indole, 37.4 percent methylnaphthalenes and 37.4 percent ethylene glycol. Two liquid phases formed. The composition of the raffinate phase, as determined by infrared analysis, was by weight 29.4 percent indole, 68.6 percent methylnaphthalenes and 2.0 percent ethylene glycol, and is represented by point B in Fig. 2. Point C in Fig. 2, determined by extending a tie line through points A and B to intersect the curve, represents the extract phase composition of 21.4 percent by weight of indole, 5.0 percent of methylnaphthalenes and 73.6 percent of ethylene glycol.

In this example only one extraction with ethylene glycol was made, which substantially reduced the indole content of the methylnaphthalenes mixture. After removal of the ethylene glycol, the extract mixture was 81 percent by weight indole and only 19 percent methylnaphthalenes while the raffinate mixture was 70 percent methylnaphthalenes and only 30 percent indoles. Thus multistage extraction with ethylene glycol would be effective for removing the indole from such a mixture.

Example II

Indole was extracted from admixture with methylnaphthalenes (50 percent alpha methylnaphthalene and 50 percent beta methylnaphthalenes) by the use of trimethylene glycol. The mixture consisted of 30 percent by weight of indole and 70 percent methylnaphthalenes. Sufficient trimethylene glycol was added to give a system having the composition shown at point A in Fig. 3 of the drawing, which was by weight 19.4 percent indole, 45 percent methylnaphthalenes and 35.6 percent trimethylene glycol. Two liquid phases formed. The composition of the raffinate phase, as determined by infrared analysis, was by weight 18.6 percent indole, 80.8 percent methylnaphthalenes and 0.6 percent trimethylene glycol, and is represented by point B in Fig. 3. Point C in Fig. 3, determined by extending a tie line through points A and B to intersect the curve, represents the extract phase composition of 20.2 percent by weight of indole, 8.6 percent by weight of methylnaphthalenes and 71.2 percent trimethylene glycol.

In this example only one extraction with trimethylene glycol was made, which substantially reduced the indole content of the methylnaphthalenes. After removal of the trimethylene glycol, the extract mixture was 70.2 percent by weight indole and only 29.8 percent methylnaphthalenes while the raffinate mixture was 81.3 percent methylnaphthalenes, 18.7 percent indoles. Thus multistage extraction with trimethylene glycol would be effective for removing the indole from such a mixture.

Example III

Indole was extracted from admixture with methylnaphthalenes (50 percent alpha methylnaphthalenes and 50 percent beta) by the use of propylene glycol. The mixture consisted of 20.3 percent by weight of indole and 79.7 percent methylnaphthalenes. Sufficient propylene glycol was added to give a system having the composition shown at point A in Fig. 4 of the drawing, which was by weight 12.7 percent indole, 50.0 percent methylnaphthalenes and 37.3 percent propylene glycol. Two liquid phases formed. The composition of the raffinate phase, as determined by infrared analysis, was by weight 10.5 percent indole, 86.0 percent methylnaphthalenes and 3.5 percent propylene glycol, and is represented by point B in Fig. 4. Point C in Fig. 4, determined by extending a tie line through points A and B to intersect the curve, represents the extract phase composition of 15.0 percent by weight of indole, 13.5 percent methylnaphthalenes and 71.5 percent propylene glycol.

In this example only one extraction with propylene glycol was made, which substantially reduced the indole content of the methylnaphthalenes. After removal of the propylene glycol, the extract mixture was 52.6 percent by weight indole and 47.4 percent methylnaphthalenes while the raffinate mixture was 89.1 percent methylnaphthalenes and only 10.9 percent indole. Thus multistage extraction with propylene glycol would be effective for removing the indole from such a mixture.

Example IV

A sample of neutral light oil obtained by the hydrogenation of coal was treated by the process of the invention in the manner outlined in Fig. 1 of the drawing and heretofore described, except that there was no use of benzene to displace high boiling aromatic hydrocarbons. The neutral light oil sample comprised aromatic and nonaromatic hydrocarbons having boiling points between 115° and 260° C. and contained about one percent by weight of indoles and about one percent of phenols. The oil was extracted with ethylene glycol in a 12-stage Scheibel column at a feed to solvent ratio of 2 to 1. The extract of glycol, indole and aromatic hydrocarbons was then back-extracted with a naphtha, n-heptane, to remove the aromatic hydrocarbons, using a feed to solvent ratio of 1 to 1.

The indole was then recovered from the ethylene glycol by extraction with isopropyl ether, using a feed to solvent ratio of 1 to 1. The phenols present were extracted with sodium hydroxide solution which also removed the dissolved ethylene glycol and the ether was stripped off. The indoles were then fractionally distilled. In this manner solid indole cuts containing from 77 to 88 percent by weight of indole were obtained. Likewise, methylindole cuts were obtained which contained 74 to 83 percent by weight of methylindoles.

Example V

A sample of neutral light oil obtained by the hydrogenation of coal was treated by the process of the invention in the manner outlined in Fig. 1 of the drawing and heretofore described, including the use of benzene to displace high-boiling aromatic hydrocarbons. The neutral light oil sample comprised aromatic and nonaromatic hydrocarbons having boiling points between 115° and 260° C. and contained about one percent by weight of indoles and about one percent of phenols. The oil was extracted with ethylene glycol in a 12-stage Scheibel column at a feed to solvent ratio of 2 to 1.

The extract of glycol, indole and aromatic hydrocarbons was then back-extracted with a naphtha, n-heptane, to remove the aromatic hydrocarbons, using a feed to solvent ratio of 1 to 1. To the raffinate of glycol, indoles and residual aromatic hydrocarbons was then added 7 percent by weight of benzene and this mixture was back-extracted with n-heptane at feed to solvent ratio of 1 to 1 to further remove high boiling aromatic hydrocarbons, partially by replacement.

The indole was then recovered from the ethylene glycol by extraction with isopropyl ether, using a feed to solvent ratio of 1 to 1. The phenols present were extracted with sodium hydroxide solution which also removed the dissolved ethylene glycol and the ether was stripped off. The indoles were then fractionally distilled. In this manner solid indole cuts containing from 75 to 90 percent by weight of indole were obtained. Likewise, methylindole cuts were obtained which contained from 80 to 88 percent by weight of methylindoles.

We claim:

1. A continuous process for recovering indoles from indole-bearing oils containing aromatic hydrocarbons which comprises extracting said oil with a lower alkylene glycol to produce a first extract of glycol, indoles and a small amount of aromatic hydrocarbons; extracting said first extract with a naphtha to leave a glycol-indoles second residue; extracting said second residue with a lower alkyl ether to produce a third extract of ether and indoles; heating said third extract to remove said ether and leave said indoles as product.

2. A process according to claim 1 wherein said lower alkylene glycol is ethylene glycol.

3. A process according to claim 1 wherein said lower alkylene glycol is trimethylene glycol.

4. A process according to claim 1 wherein said lower alkylene glycol is propylene glycol.

5. A process according to claim 1 wherein said naphtha is n-heptane.

6. A process according to claim 1 wherein said naphtha is petroleum ether.

7. A process according to claim 1 wherein said naphtha is cyclohexane.

8. A process according to claim 1 wherein said lower alkyl ether is isopropyl ether.

9. A process according to claim 1 wherein said lower alkyl ether is n-butyl ether.

10. A continuous process for recovering indoles from indole-bearing oils containing aromatic hydrocarbons which comprises extracting said oil with a lower alkylene glycol to produce a first extract of glycol, indoles and a small amount of aromatic hydrocarbons; extracting said first extract with a naphtha to leave a glycol-indoles second residue; adding benzene to said second residue and then extracting said second residue with a naphtha to further remove aromatic hydrocarbons and leave a glycol-indole third residue; extracting said third residue with a lower alkyl ether to produce a fourth extract of ether and indoles; heating said fourth extract to remove said ether and leave said indole as residue; and then fractionating said indoles to recover said indoles as products.

11. A process according to claim 10 wherein said lower alkylene glycol is ethylene glycol.

12. A process according to claim 10 wherein said lower alkylene glycol is trimethylene glycol.

13. A process according to claim 10 wherein said lower alkylene glycol is propylene glycol.

14. A continuous process for recovering indoles from indole-bearing oils containing aromatic hydrocarbons which comprises extracting said oil with a lower alkylene glycol to produce a first extract of glycol, indoles and a small amount of aromatic hydrocarbons; extracting said first extract with a naphtha to remove as a second extract naphtha and the bulk of the hydrocarbons present and leave a glycol-indoles second residue; separating said naphtha from said second extract by distillation and recycling said naphtha to said process; adding benzene to said second residue and then extracting said second residue with a naphtha to further remove aromatic hydrocarbons in a naphtha-benzene-aromatic hydrocarbons third extract and leave a glycol-indole third residue; separating said naphtha and said benzene from said third extract by distillation and recycling said naphtha and said benzene to said process; extracting said third residue with a lower alkyl ether to produce a fourth extract of ether and indoles; heating said fourth extract to remove said ether and leave said indoles as residue; recovering and recycling said ether to said process; and then fractionating said indoles to remove said indoles as products.

15. A process according to claim 14 wherein said lower alkylene glycol is ethylene glycol.

16. A process according to claim 14 wherein said lower alkylene glycol is trimethylene glycol.

17. A process according to claim 14 wherein said lower alkylene glycol is propylene glycol.

18. A continuous process for recovering indoles from indoles-bearing oils containing aromatic hydrocarbons which comprises extracting said oil with ethylene glycol to produce a first extract of glycol, indoles and a small amount of aromatic hydrocarbons; extracting said first extract with n-heptane to leave a glycol-indoles second residue; extracting said second residue with isopropyl ether to produce a third extract of ether and indoles; heating said third extract to remove said ether and leave said indoles as product.

References Cited in the file of this patent
FOREIGN PATENTS

| | | |
|---|---|---|
| 812,079 | Germany | Aug. 27, 1951 |
| 695,470 | Great Britain | Aug. 12, 1953 |